Sept. 1, 1931.   H. COE ET AL   1,821,829
GRAIN DRILL DISK
Filed May 17, 1930

Harlan Coe
Clifton P. Coe
INVENTORS

BY Victor J. Evans
ATTORNEY

WITNESS: J. T. L. Wright

Patented Sept. 1, 1931

1,821,829

UNITED STATES PATENT OFFICE

HARLAN COE, OF SPOKANE, AND CLIFTON P. COE, OF PLAZA, WASHINGTON

GRAIN DRILL DISK

Application filed May 17, 1930. Serial No. 453,307.

The object of this invention is the provision of an attachment for disk grain drills which will cause the seed to be deposited in the soil at a uniform depth regardless of whether the drill is being operated in firm or soft soil.

To the attainment of the foregoing the invention consists in the improvement hereinafter described and definitely claimed.

One of the difficulties encountered in drilling in grain is to prevent the seed being deposited at irregular depths as the nature of the soil varies. In soft or loose soil the disks cut deeper into the soil and deposit the seed too deep for proper seeding, causing the seed to germinate slowly, thus retarding the root formation and cutting down the yield, while in other types of soil the seed is not planted at the proper depth.

It will be noted that with our simple improvement, which is really in the nature of an attachment for grain disks, that the disk is permitted to enter the soil only at a predetermined depth and consequently the seed will be deposited beneath the earth at a predetermined distance so that all the seed will germinate at the same time and thereby materially increase the yield.

Figure 1:
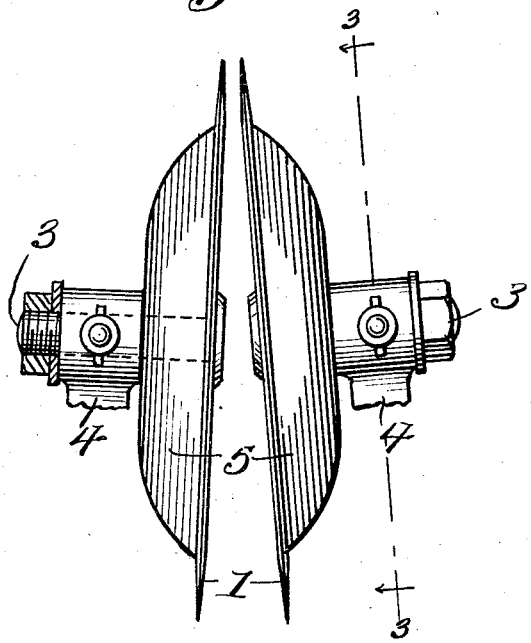
Figure 1 is a side elevation of the disks of a grain drill provided with the improvement.
Figure 2:
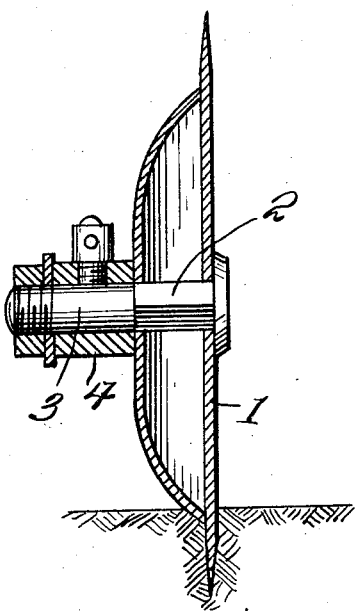
Figure 2 is an approximately central sectional view through a grain disk equipped with the improvement.
Figure 3:
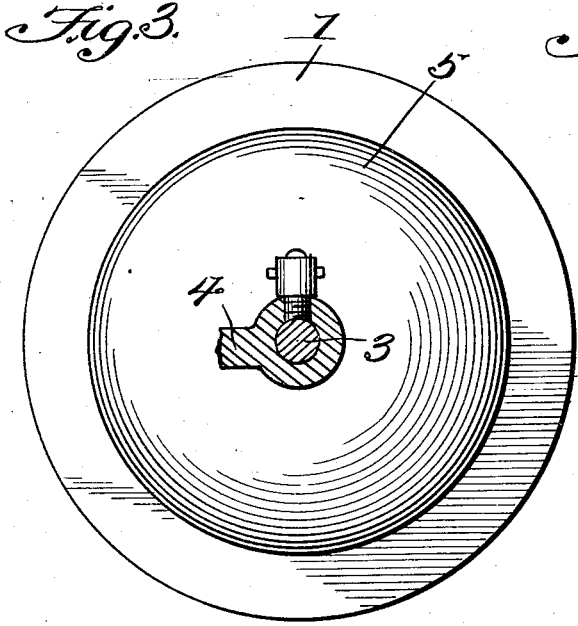
Figure 3 is a sectional view approximately on the line 3—3 of Figure 1.
Figure 4:
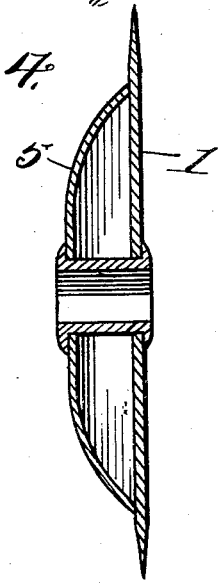
Figure 4 is a sectional view on the line 4—4 of Figure 2.

Referring now to the drawings in detail, the numeral 1 designates an ordinary disk for grain drills. The disks, as disclosed by Figure 1 of the drawings, are arranged in pairs and are disposed angularly with respect to each other. Each of the disks has a central squared opening for the reception of the squared end 2 of the spindle bolt 3. The spindle bolt has held thereon by the usual nut and washer the draw bar 4 which is provided with the usual grease cup.

Of course, the portion of the bolt that is received through the draw bar is round in cross section. Our improvement is in the nature of a concavo-convex disk 5 whose edge is in contact with the outer face of the disk 1. The central or bulged portion of the concavo convex plate has a squared opening therethrough for the reception of the squared portion 2 of the spindle bolt 3 and the upper face of the concavo convex plate is in direct contact with the draw bar 4.

A disk attachment as above set forth can be cheaply manufactured and readily applied on the disk 1. The member 5 is, of course, in the nature of a depth regulator and will prevent the disk entering the soil beyond a predetermined distance. The result is that the seed delivered from the grain drills will be deposited at a uniform depth in the soil, regardless of whether the drill is being operated in firm or soft soil.

Having described the invention, we claim:

An attachment for the disks of grain drills, and in which the disk is fixed on a squared portion of a spindle bolt on which is journaled a draw bar and comprising a member round in plan and concavo convex in cross section and centrally formed with a squared opening to receive the squared portion of the spindle bolt therethrough, to have its outer face contacted by the draw bar and to have its edge forced by such contact against the face of the disk.

In testimony whereof we affix our signatures.

HARLAN COE.
CLIFTON P. COE.